United States Patent [19]
Ziegler et al.

[11] Patent Number: 5,863,061
[45] Date of Patent: Jan. 26, 1999

[54] COLLAPSIBLE THREE WHEELED STROLLER

[76] Inventors: Scott William Ziegler, 932 Vista del Monte Way, El Cajon, Calif. 92020; Randolph L. Kiser, 789 Johnston Dr., Sidney, Ohio 45365; David J. Stroud, 360 Mapletrace Trail, Dayton, Ohio 45458; Cheri Wagner, 9625 Greenville Falls Rd., Covington, Ohio 45318

[21] Appl. No.: 736,747
[22] Filed: Oct. 25, 1996
[51] Int. Cl.⁶ ...................................................... B62B 7/08
[52] U.S. Cl. ........................... 280/642; 280/42; 280/650; 280/62
[58] Field of Search ............................ 280/642, 42, 644, 280/647, 650, 657, 658, 646, 62

[56] References Cited

U.S. PATENT DOCUMENTS

| | | | |
|---|---|---|---|
| 1,576,075 | 3/1926 | Tisdell | 280/642 |
| 3,390,893 | 7/1968 | Maclaren | 280/650 |
| 3,881,739 | 5/1975 | Laune | 280/42 |
| 4,077,640 | 3/1978 | Perego | 280/650 |
| 4,132,429 | 1/1979 | Woods | 280/650 |
| 4,191,397 | 3/1980 | Kassai | 280/647 |
| 4,216,974 | 8/1980 | Kassai | 280/42 |
| 4,266,807 | 5/1981 | Griffin | 280/650 |
| 4,272,100 | 6/1981 | Kassai | 280/650 |
| 4,986,564 | 1/1991 | Liu | 280/642 |
| 5,288,098 | 2/1994 | Shamie | 280/642 |
| 5,460,398 | 10/1995 | Huang | 280/642 |
| 5,511,441 | 4/1996 | Arai | 74/501.6 |
| 5,524,503 | 6/1996 | Ishikura | 74/501.6 |
| 5,535,483 | 7/1996 | Cabagnero | 280/642 |
| 5,622,376 | 4/1997 | Shamie | 280/642 |
| 5,695,212 | 12/1997 | Hinkston | 280/62 |

FOREIGN PATENT DOCUMENTS

611689 A1  8/1994  European Pat. Off. ............... 280/642

*Primary Examiner*—Brian L. Johnson
*Assistant Examiner*—Gary Savitt

[57] ABSTRACT

A three wheeled stroller which is adapted for use in transporting an infant. The stroller includes a collapsible frame structure and a seat which is adapted to be secured thereto. This frame structure is both laterally collapsible and foldable to facilitate the storage and transportation of the stroller. Both the collapsing and the folding can be initiated by way of an upper lock assembly positioned adjacent the handles of the frame.

4 Claims, 9 Drawing Sheets ical extent therebetween. Likewise, the stroller includes a second side frame having an upper extent, a lower extent and an intermediate extent therebetween, the lower extents of the first and second side frames are pivotally connected. The stroller further includes a first side rearward frame having an end interconnected with the intermediate portion of the first side frame and a distal end. Likewise, the stroller includes a second side rearward frame having an end interconnected with the intermediate portion of the second side frame and a distal end. A first upper lateral brace is secured to the upper extent of the first side frame, and a second upper lateral brace is secured to the upper extent of the second side frame. An upper lateral lock assembly serves to pivotally interconnect the first and second upper lateral braces. A front wheel assembly is interconnected to the lower extents of the first and second side frames. Additionally, a first side rear wheel assembly is secured to the distal end of the first rearward frame, and a second side rear wheel assembly is secured to the distal end of the second rearward frame.

COLLAPSIBLE THREE WHEELED STROLLER

BACKGROUND OF THE INVENTION

1. Field of the Invention

The present invention relates to a three wheeled stroller and, more particularly, to such a stroller which is both laterally collapsible and foldable.

2. Description of the Prior Art

The use of three wheeled strollers is known in the prior art. Furthermore, the use of foldable three wheeled strollers is also known in the prior art. These folding arrangements contemplate folding one or more frame components relative to one another. All such folding arrangements enable the stroller to be more readily stored and transported.

However, many such folding arrangements require the simultaneous movement of various frame components. Additionally, the arrangements of the prior art often require the manipulation of multiple pins, or other such locking means, before a folded arrangement can be achieved. Such structures are not convenient for adults who are attempting to both fold/unfold the stroller and attend to a small child. Furthermore, even when such strollers are finally brought into their folded orientation they still tend to be bulky and awkward.

The literature discloses various stroller arrangements. Note U.S. Pat. No. 5,468,009 to Eyman et al.; U.S. Pat. No. 5,356,171 to Schmidlin et al.; and U.S. Pat. No. 5,364,119 to Leu each of which disclose folding three wheeled strollers or stroller frames. Additionally, U.S. Pat. No. 5,076,599 to Lockett et al.; U.S. Pat. No. 5,029,891 to Jacobs; U.S. Pat. No. 4,953,880 to Sudakoff et al.; U.S. Pat. No. 4,934,728 to Chen and U.S. Design Pat. No. 364,131 Eichhorn et al. all disclose various three wheeled stroller arrangements.

However, none of these strollers is laterally collapsible. Furthermore, none of the prior art strollers is laterally collapsible and foldable in a one step process.

The present invention achieves its intended purposes, objects and advantages over the prior art through a new, useful and unobvious combination of components, through the use of a minimum number of functioning parts, at a reasonable cost to manufacture, and through the utilization of only readily available and conventional materials.

Therefore, it is an object of the present invention to provide an improved three wheeled stroller with a first side frame having an upper extent, a lower extent, and an intermediate extent therebetween. Likewise, the stroller includes a second side frame having an upper extent, a lower extent and an intermediate extent therebetween, the lower extents of the first and second side frames are pivotally connected. The stroller further includes a first side rearward frame having an end interconnected with the intermediate portion of the first side frame and a distal end. Likewise, the stroller includes a second side rearward frame having an end interconnected with the intermediate portion of the second side frame and a distal end. A first upper lateral brace is secured to the upper extent of the first side frame, and a second upper lateral brace is secured to the upper extent of the second side frame. An upper lateral lock assembly serves to pivotally interconnect the first and second upper lateral braces. A front wheel assembly is interconnected to the lower extents of the first and second side frames. Additionally, a first side rear wheel assembly is secured to the distal end of the first rearward frame, and a second side rear wheel assembly is secured to the distal end of the second rearward frame.

Therefore, it is an object of this invention to provide a three wheeled stroller which overcomes the aforementioned inadequacies of the prior art devices and which constitutes an improvement which is a significant contribution to the advancement of the art.

Another object of the invention to enable a three wheeled stroller to be both laterally collapsible and foldable.

It is a further object of the present invention to provide such a laterally collapsible and foldable three wheeled stroller wherein collapsing and folding can be initiated in a one step manner.

It is another object of the present invention to provide a three wheeled stroller which may be easily and efficiently manufactured and marketed.

It is a further object of the present invention to provide a three wheeled stroller construction which is of a durable and reliable construction.

The foregoing has outlined some of the more pertinent objects of the present invention. These objects should be construed to be merely illustrative of some of the more prominent features and applications of the intended invention. Many other beneficial results could be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention as defined by the claims taken in conjunction with the accompanying drawings.

SUMMARY OF THE INVENTION

The invention is defined by the appended claims with the specific embodiment shown on the attached drawings. For the purposes of summarizing the invention, the invention essentially comprises a collapsible three wheeled stroller for use in transporting an infant.

This stroller includes a first side frame having an upper extent and a lower extent and a pivot assembly therebetween. Likewise, a second side frame is included having an upper extent and a lower extent and a pivot assembly therebetween. The lower extents of these first and second side frames are pivotally connected. The stroller frame further includes a first side rearward frame having an end secured to the pivot assembly of the first side and a distal end. Likewise, the stroller includes a second side rearward frame having an end secured to the pivot assembly of the second side and a distal end. A first upper lateral brace is secured to the upper extent of the first side frame, and a second upper lateral brace is secured to the upper extent of the second side frame. Furthermore, an upper lateral lock assembly serves to pivotally interconnect the first and second upper lateral braces. A front wheel assembly is interconnected to the lower extents of the first and second side frames. Furthermore, a first side rear wheel assembly is secured to the distal end of the first rearward frame, and a second side rear wheel assembly is secured to the distal end of the second rearward frame. A first lower lateral brace is secured to the first side rear wheel assembly, and a second lower lateral brace is secured to the second side rear wheel assembly. A lower lateral lock assembly serves to pivotally interconnect these first and second lower lateral braces. Additionally, a first cross brace serves to interconnect the lower extent of the second side frame and the first rear wheel assembly. Likewise, a second cross brace serves to interconnect the lower extent of the first side frame and the second rear wheel assembly. The first side intermediate pivot assembly includes a housing component, a receptacle component, and a plunger slidably positioned within the housing component. This plunger is spring biased such as to normally extend into the receptacle component and thereby prevent pivotal movement between the upper and lower extents of the first side frame. In a similar fashion, the second side intermediate pivot assembly includes a housing component and a receptacle component, and a plunger slidably positioned within the housing component. The plunger is spring biased such as to normally extend into the receptacle component and thereby prevent pivotal movement between the upper and lower extent of the second side frame. The frame also includes a first plunger linkage which interconnects the first upper lateral brace and the plunger of the first side intermediate pivot assembly. This first plunger linkage functions such that the pivotal movement of the first upper lateral brace disengages the plunger of the first intermediate pivot assembly from the receptacle component to thereby permit pivotal movement between the upper and lower extents of the first side frame. In a similar fashion, a second plunger linkage serves to interconnect the second upper lateral brace and the plunger of the second side intermediate pivot assembly. Thus, the second plunger linkage functions such that pivotal movement of the second upper lateral brace disengages the plunger of the second intermediate pivot assembly from the receptacle component to thereby permit pivotal movement between the upper and lower extents of the second side frame.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. Its should be appreciated by those skilled in the art that the conception and the disclosed specific embodiment may be readily utilized as a basis for modifying or designing other structures for carrying out the same purposes of the present invention. It should also be realized by those skilled in the art that such equivalent methods and structures do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

The same reference numerals refer to the same parts through the various Figures.

DESCRIPTION OF THE PREFERRED EMBODIMENT

Figure 1:
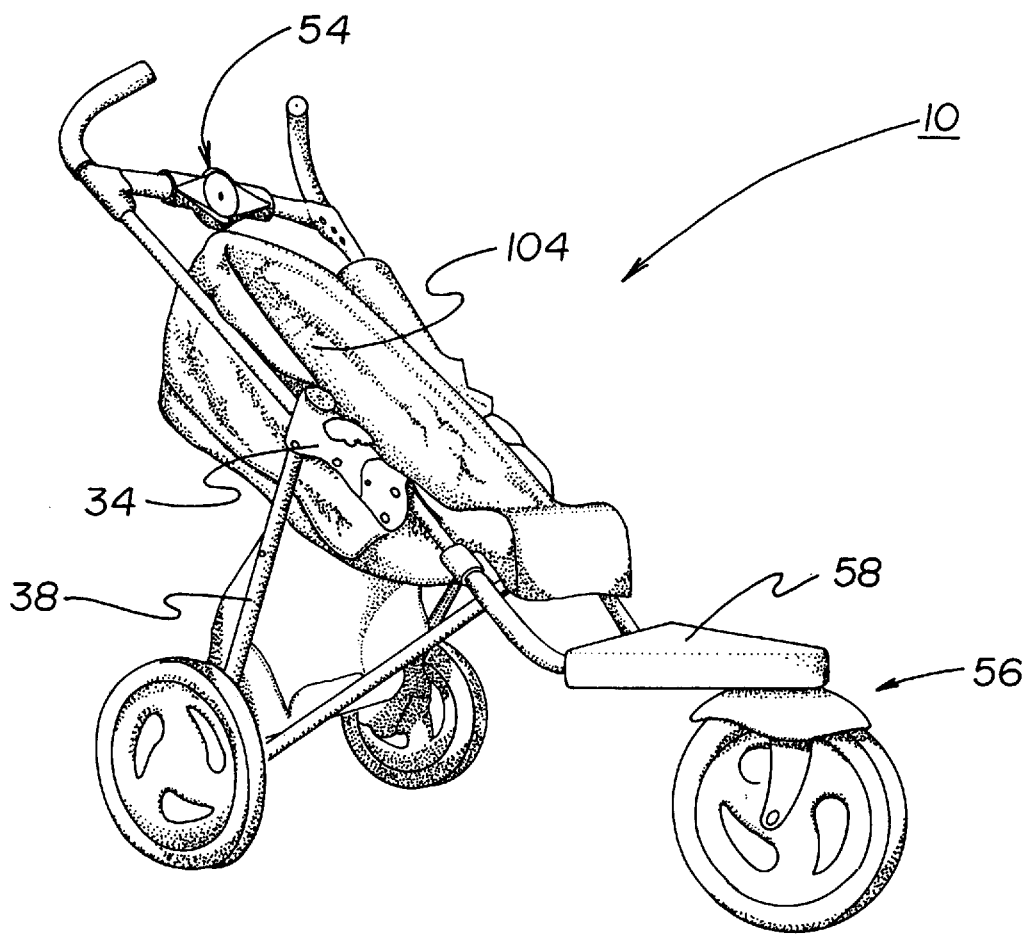
FIG. 1 is a perspective view of the preferred embodiment of the three wheeled stroller constructed in accordance with the principles of the present invention.

The present invention relates to a collapsible three wheeled stroller 10 for use in transporting an infant. In its broadest context, the present invention includes a frame structure to which a seat is adapted to be secured. This frame structure is both laterally collapsible and foldable. Both the collapsing and the folding can be initiated by way of an upper lock assembly positioned adjacent the handles of the frame. The various components of the present invention, and the manner in which they interrelate, will be described in greater detail hereinafter.

The frame structure 20 includes a first and second side frame 22 and 24, each of identical construction. Each side frame includes an upper extent 26, a lower extent 28 and an intermediate portion therebetween. The upper extent 26 of each side frame takes the form of a curved handle. These handles, as with other components of the frame, can be covered in a resilient foam padding. Each side frame also includes a curved seating frame element 32 adjacent its lower extent. Furthermore, each side frame incorporates a pivot assembly between its upper and lower extents. More specifically, the first side frame 22 includes a first pivot assembly 34 and the second side frame 24 includes a second pivot assembly 36. The relationship between each pivot assembly, and its corresponding side frame, can most clearly be seen with reference to FIGS. 2 and 3. Each of the pivot assemblies has a first, engaged, orientation which prevents the pivotal movement between the upper 26 and lower extents 28 of the side frame. Alternatively, each pivot assembly has a second, disengaged, orientation which permits the pivotal movement between the upper 26 and lower extents 28 of the side frame. These pivot assemblies will be described in greater detail hereinafter. In order to facilitate the complete collapsing of the stroller, the two side frames 22 and 24 are pivotally interconnected at their lower extents 28. The manner in which the entire frame structure 20 collapses will be described in greater detail hereinafter.

A first and second side rearward frame 38 and 42 constitute two more elements of the overall frame structure 20. The first side rearward frame 38 has one of its ends interconnected with the intermediate portion of the first side frame 22. More specifically, this end is secured to the pivot assembly of the first side 34. The relationship between the first side rearward frame 38 and the first side pivot assembly 34 can most clearly be seen with reference to FIG. 3. This first side rearward frame 38 also has a distal end 44. In a similar fashion, the second side rearward frame 42 has one of its ends interconnected with the intermediate portion of the second side frame 24. More specifically, this end is secured to the pivot assembly of the second side 36. This second side rearward frame 42 also has a distal end 46. Again, the relationship between these two components can most clearly be seen with reference to FIG. 3.

Lateral stability is provided to the frame structure in three ways: a pair of cross braces; an upper pair of lateral braces; and a lower pair of lateral braces. The upper pair of lateral braces will next be described. The upper pair of lateral braces includes a first upper lateral brace 48 pivotally secured to the upper extent 26 of the first side frame 22, and a second upper lateral brace 52 pivotally secured to the upper extent 26 of the second side frame 24. These two lateral braces are pivotally interconnected by way of an upper lateral lock assembly 54. The details regarding this lateral lock assembly 54 will be described in greater detail hereinafter.

Figure 2:
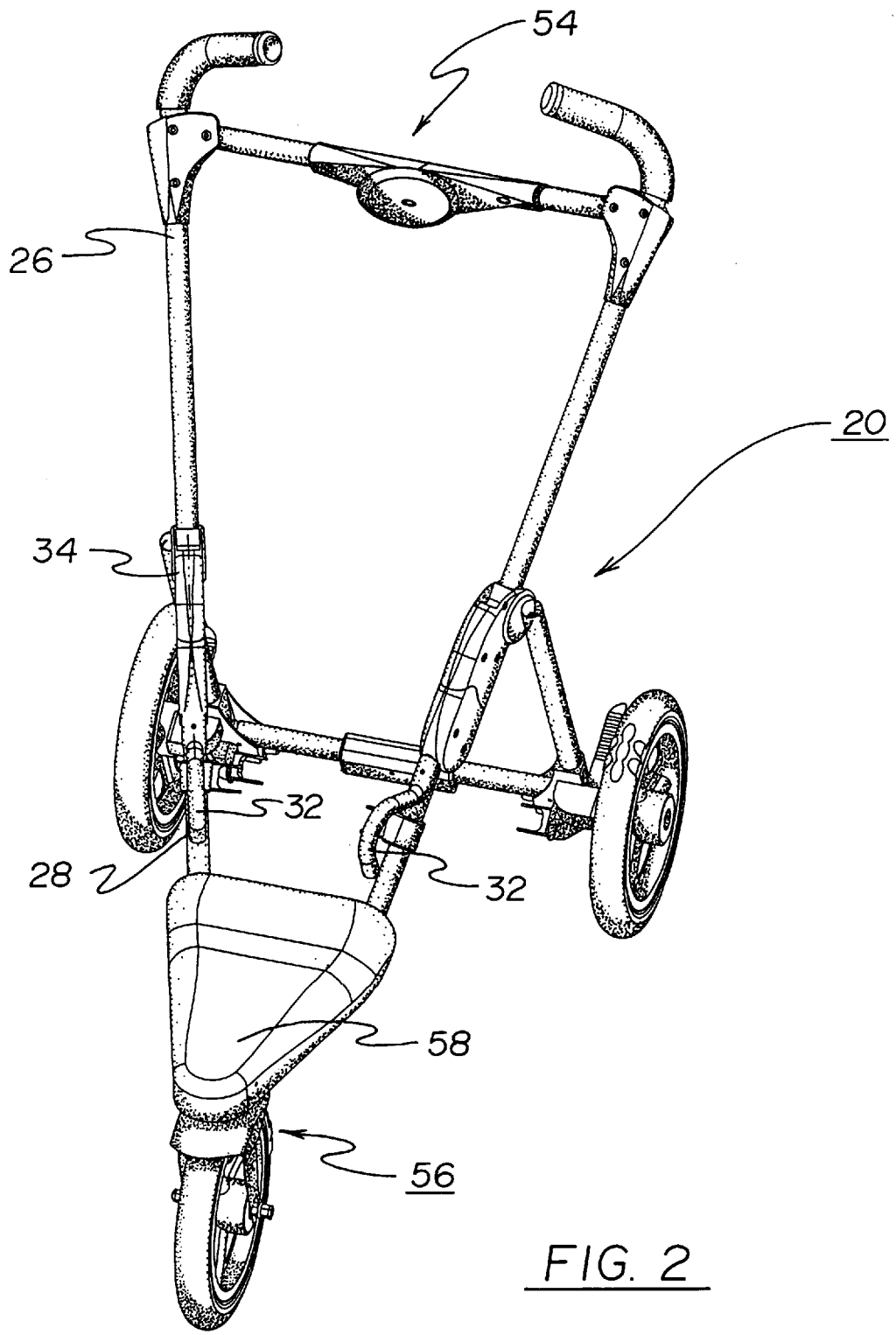
FIG. 2 is a perspective view of the three wheeled stroller with the seating and cross braces removed for clarity.
Figure 3:
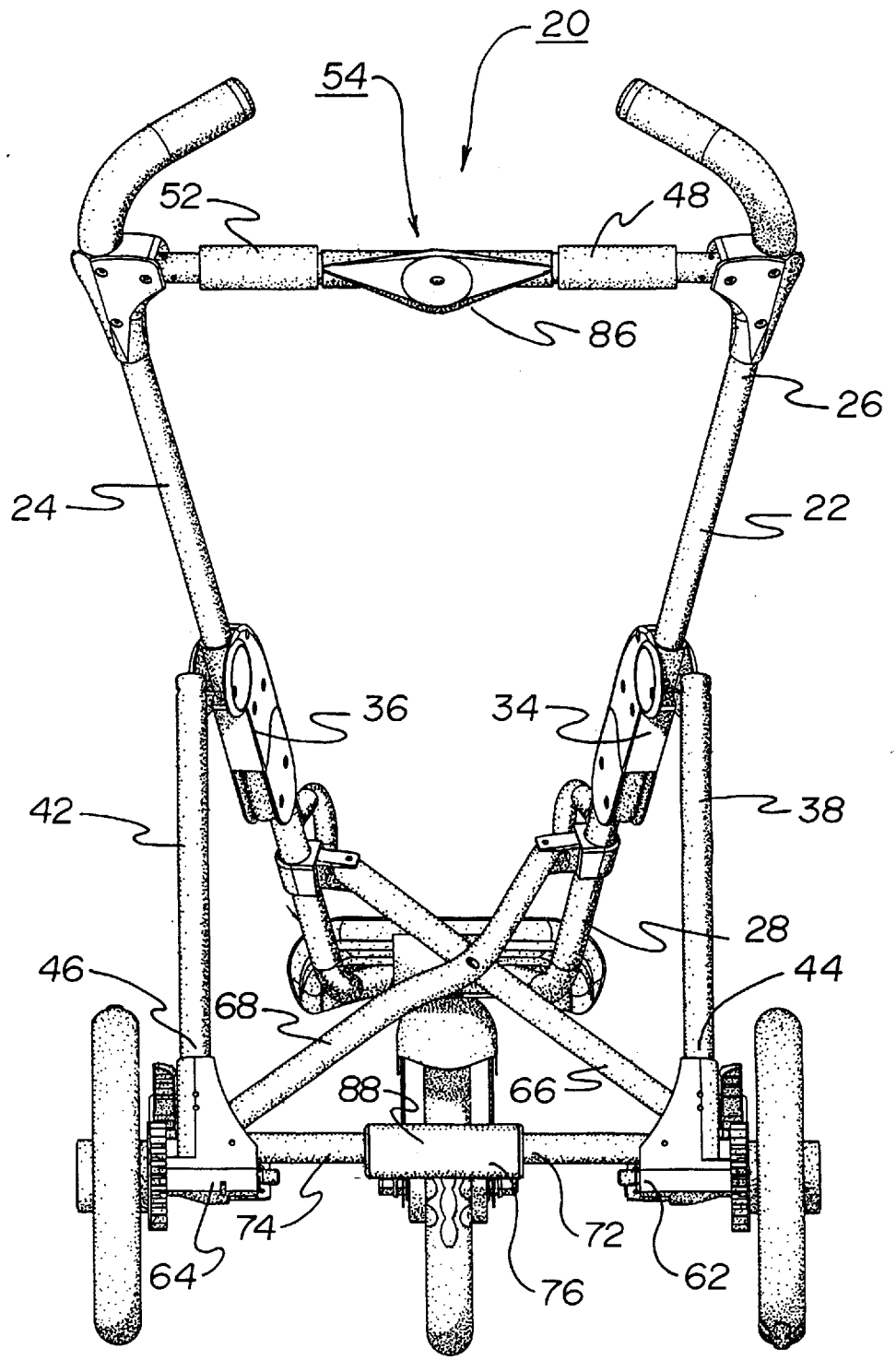
FIG. 3 is a rear elevational view of the stroller frame.
Figure 4:
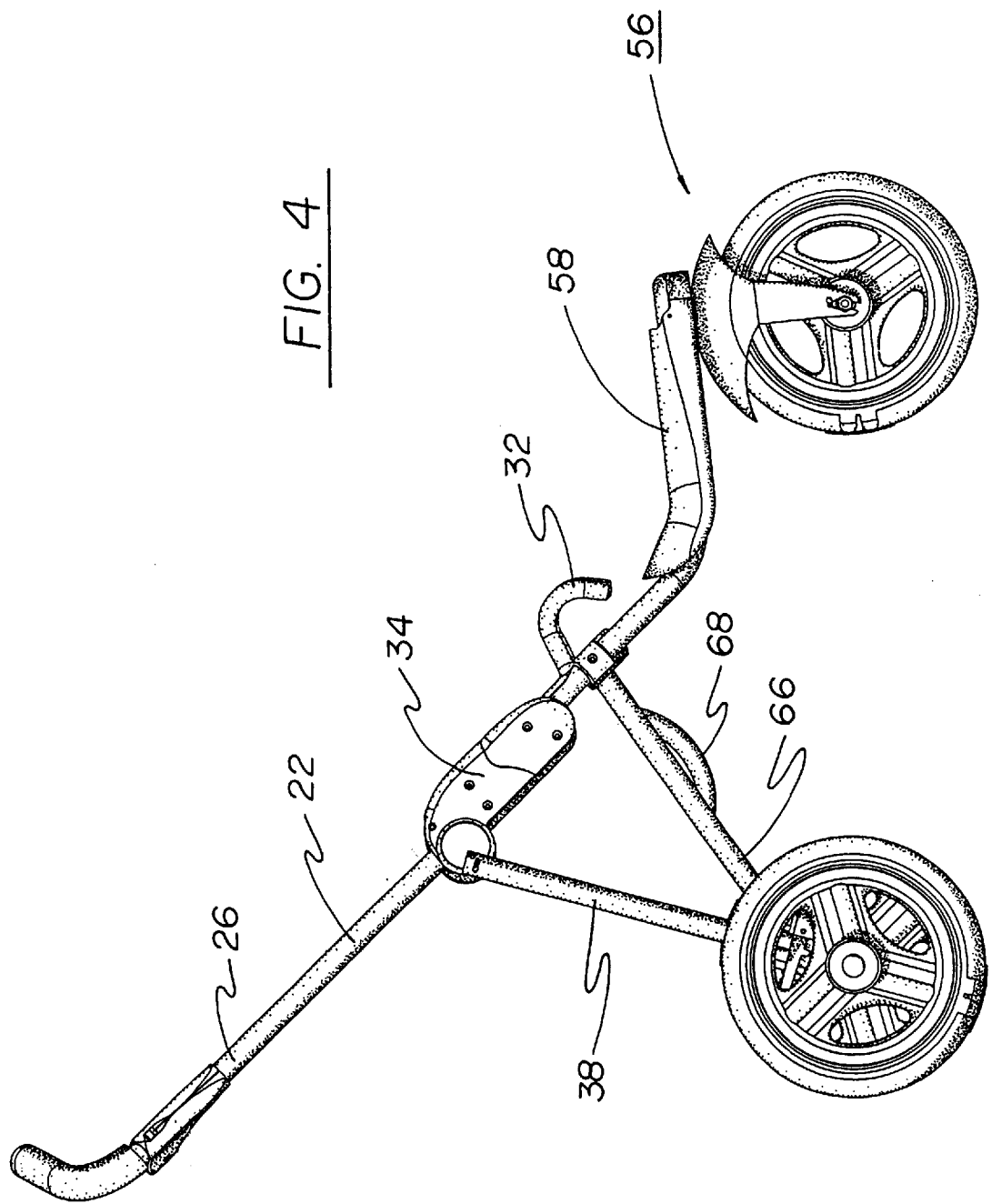
FIG. 4 is a side elevational view of the stroller frame.
Figure 5:
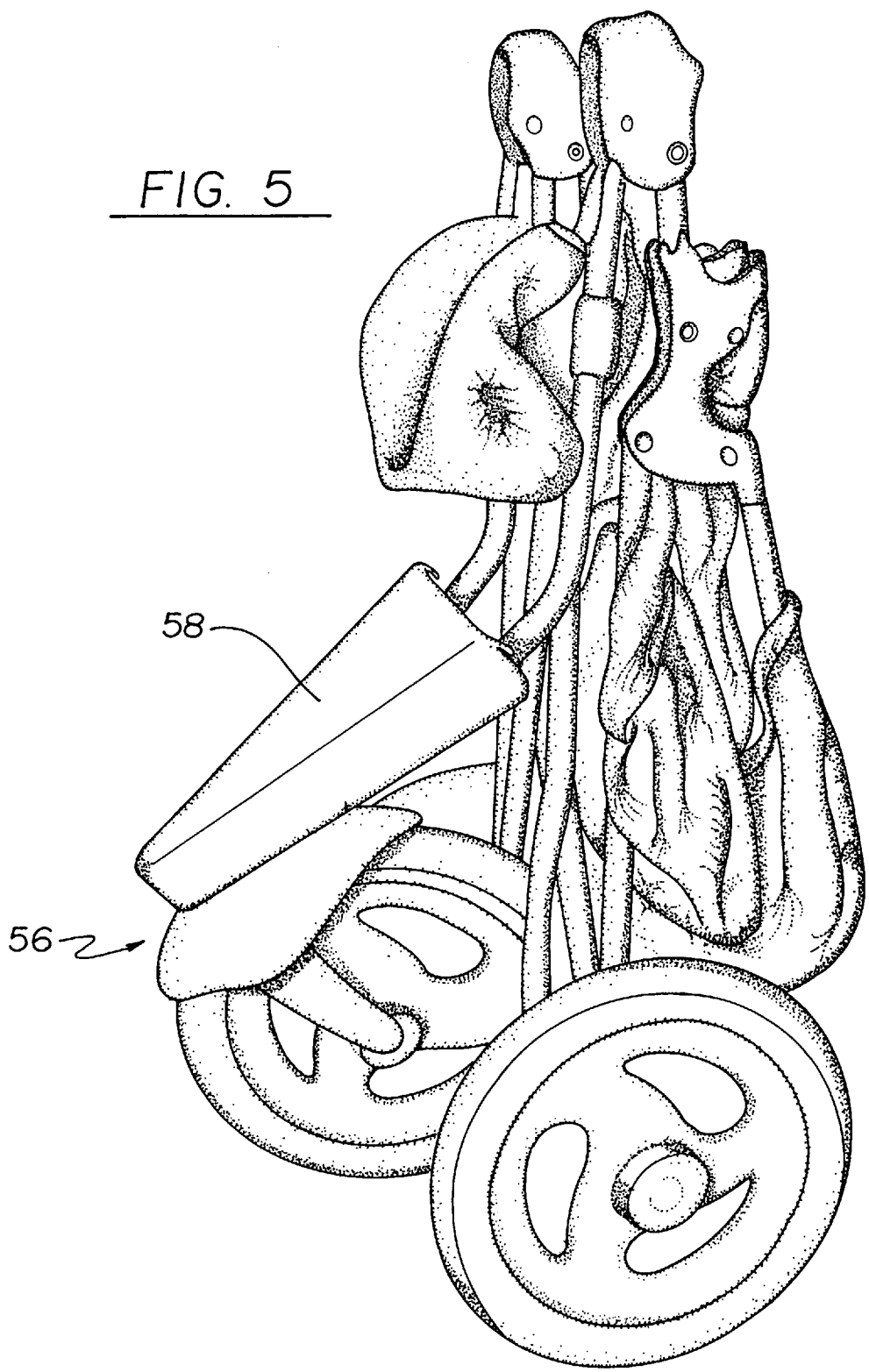
FIG. 5 is a view of the stroller in its collapsed configuration.
Figures 6, 7:
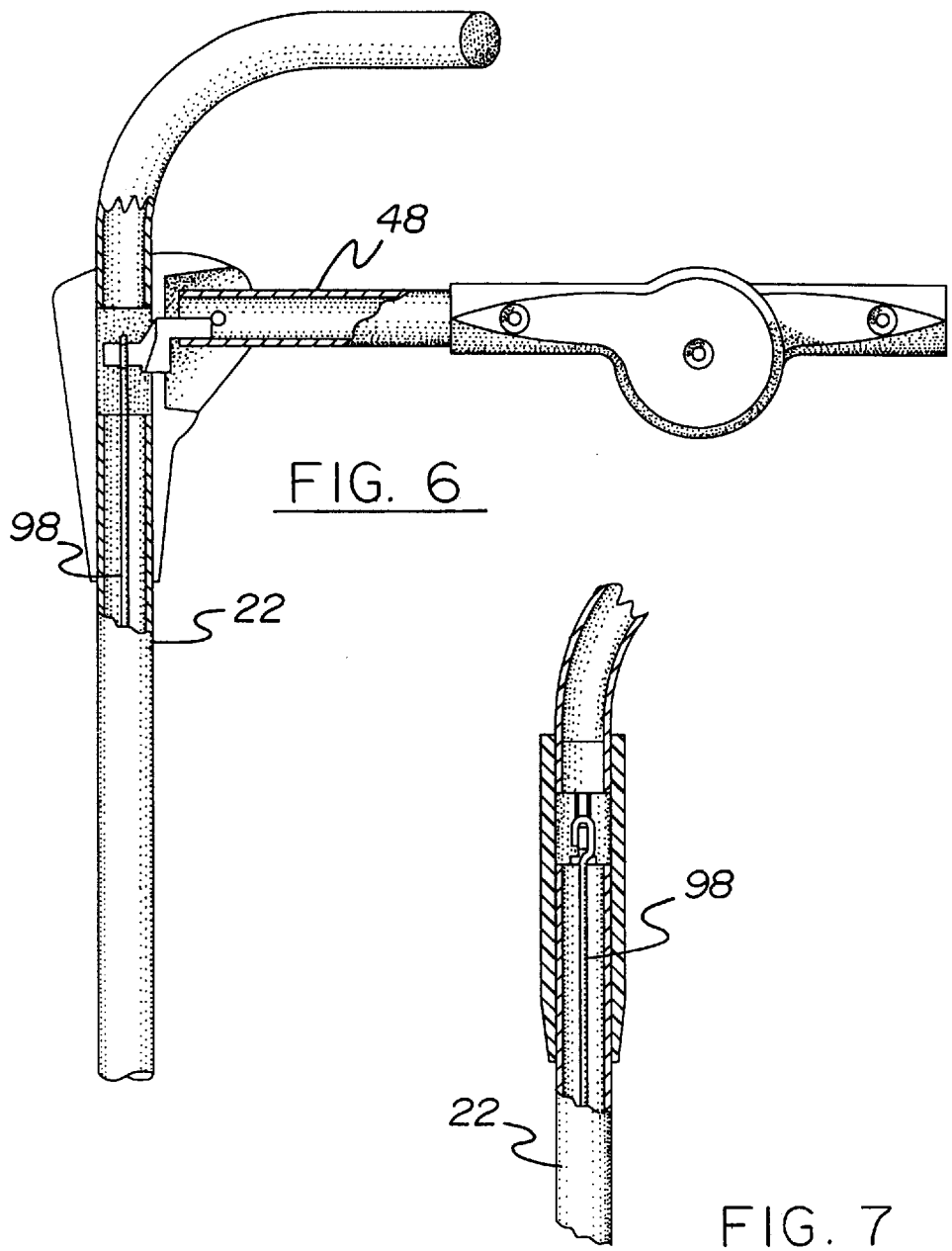
FIG. 6 is a view of the upper lateral brace in its locked orientation.
FIG. 7 is a view of the upper lateral brace in its unlocked orientation.

The front wheel assembly 56 of the stroller 10 is interconnected to the lower extents 28 of both the first and second side frames 22 and 24. In the preferred embodiment, means are included to enable the front wheel to swivel about a vertical axis. Such an arrangement enables the stroller to be easily maneuvered. Additionally, means are included to enable, at the user's discretion, the front wheel to be locked in a desired orientation relative to the vertical axis. Such means can take the form of a threaded engagement member. Such engagement member could be selectively engaged onto the front wheel assembly 56 to prevent its relative rotation. With reference to FIGS. 1 and 2, a deck plate 58 can be positioned above the front wheel assembly 56.

The stroller 10 also employs a first and second rear wheel assembly 62 and 64. More specifically, a first side rear wheel assembly 62 is secured to the distal end 44 of the first rearward frame 38. In a similar fashion, a second side rear wheel assembly 64 is secured to the distal end 46 of the second rearward frame 42. To provide additional rigidity, the first side rear wheel assembly 62 is also secured to the distal end of a first cross brace 66. Likewise, the second side rear wheel assembly 64 is secured to the distal end of a second cross brace 68. The relationship between the two wheel assemblies 62 and 64, the rearward frames 38 and 42, and the cross braces 66 and 68 can most clearly been seen with reference to FIGS. 2 and 3. The cross braces 66 and 68 will be described in greater detail hereinafter.

As indicated hereinabove, a pair of lower lateral braces provides a degree of lateral stability to the entire frame structure 20. The pair includes a first lower lateral brace 72 pivotally secured to the first side rear wheel assembly 62, and a second lower lateral brace 74 pivotally secured to the second side rear wheel assembly 64. A lower lateral lock assembly 76 serves to pivotally interconnect the first and second lower lateral braces 72 and 74. The lower lateral braces can most clearly be seen in reference to FIG. 3.

As indicated hereinabove, a pair of cross braces 66 and 68 provide another degree of lateral rigidity to the frame structure 20. The pair includes a first cross brace 66 having an end interconnected to the lower extent 28 of the second side frame 24 and a distal end connected to the first rear wheel assembly 62. Likewise, a second cross brace 68 has an end interconnected the lower extent 28 of the first side frame 22 and a distal end connected to the second rear wheel assembly 64. The pair of cross braces 66 and 68 can most clearly be seen in reference to FIG. 3. For sake of clarity, the pair of cross braces 66 and 68 have been removed from FIGS. 1 and 2. For each side, a clevis is employed in interconnecting the cross brace to the lower extent of the side frame. Specifically, a first clevis is employed in interconnecting the first cross brace to the lower extent of the second side frame; and a second clevis is employed in interconnecting the second cross brace to the lower extent of the first cross brace. Each clevis permits it corresponding cross brace to both pivot and rotate relative to the lower extent of the side frame.

Turning now to the lateral lock assemblies, the upper lateral lock assembly 54 includes a first hinge component and a second hinge component pivotally disposed between the first and second upper lateral braces 48 and 52. The lateral lock assemblies, per se, are generally described in co-pending application Ser. No. 08/736,743, attorney docket number P-4741, entitled Collapsible Three Wheel Stroller With Improved Hinge, filed concurrently herewith, the subject matter of which is incorporated herein by reference.

The lower lateral lock assembly 76 includes a collar 88 which is employed in bringing the lower lateral lock assembly into its disengaged orientation. The disengaged orientation of the lower lateral lock assembly permits the relative pivotal movement of the lower lateral braces.

Figures 10, 11, 12:
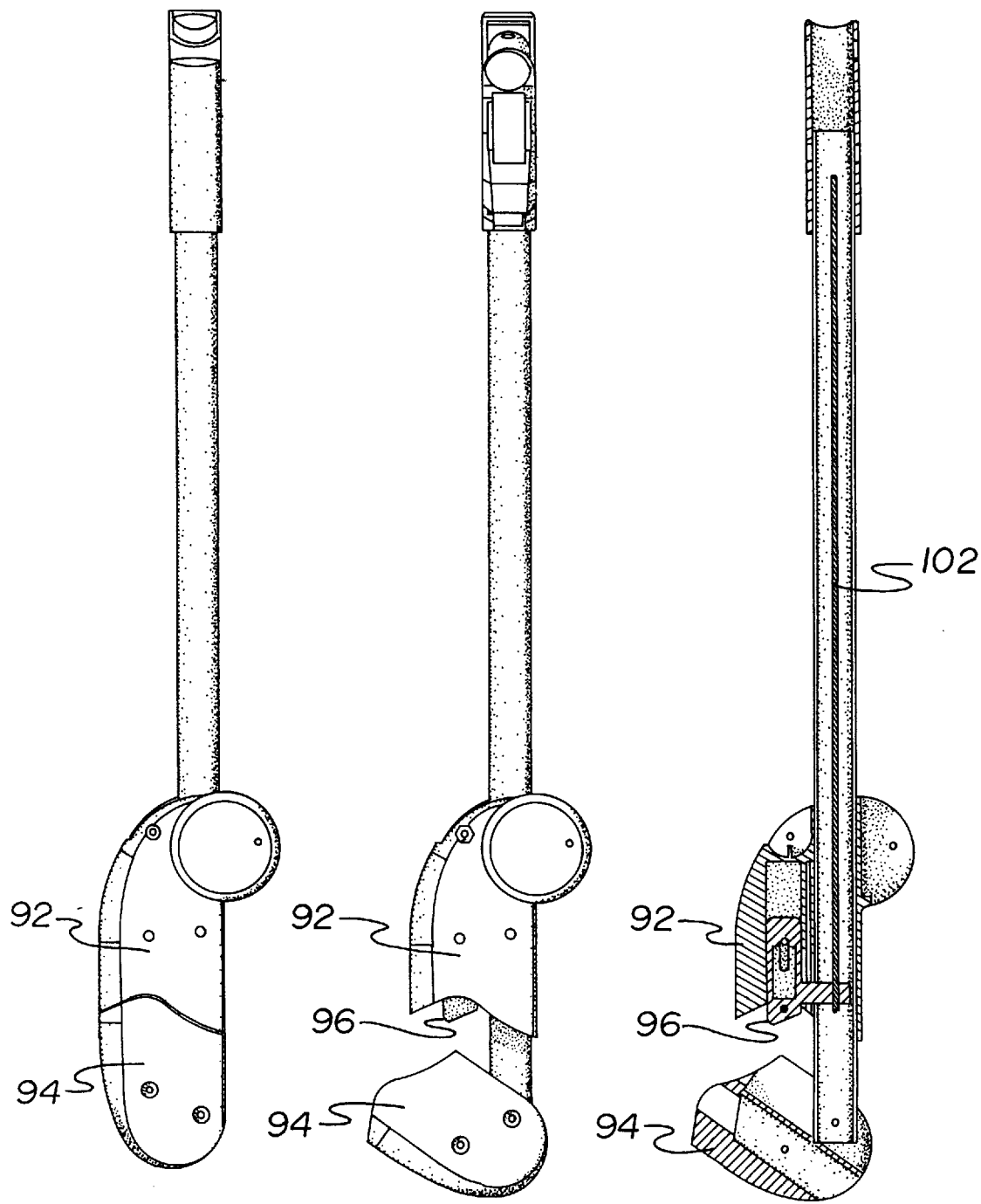
FIG. 10 is a side elevational of one of the pivot assemblies.
FIG. 11 is a side elevational view of one of the pivot assemblies in its disengaged orientation.
FIG. 12 is a sectional view of one of the pivot assemblies in its disengaged orientation.
Figure 13:
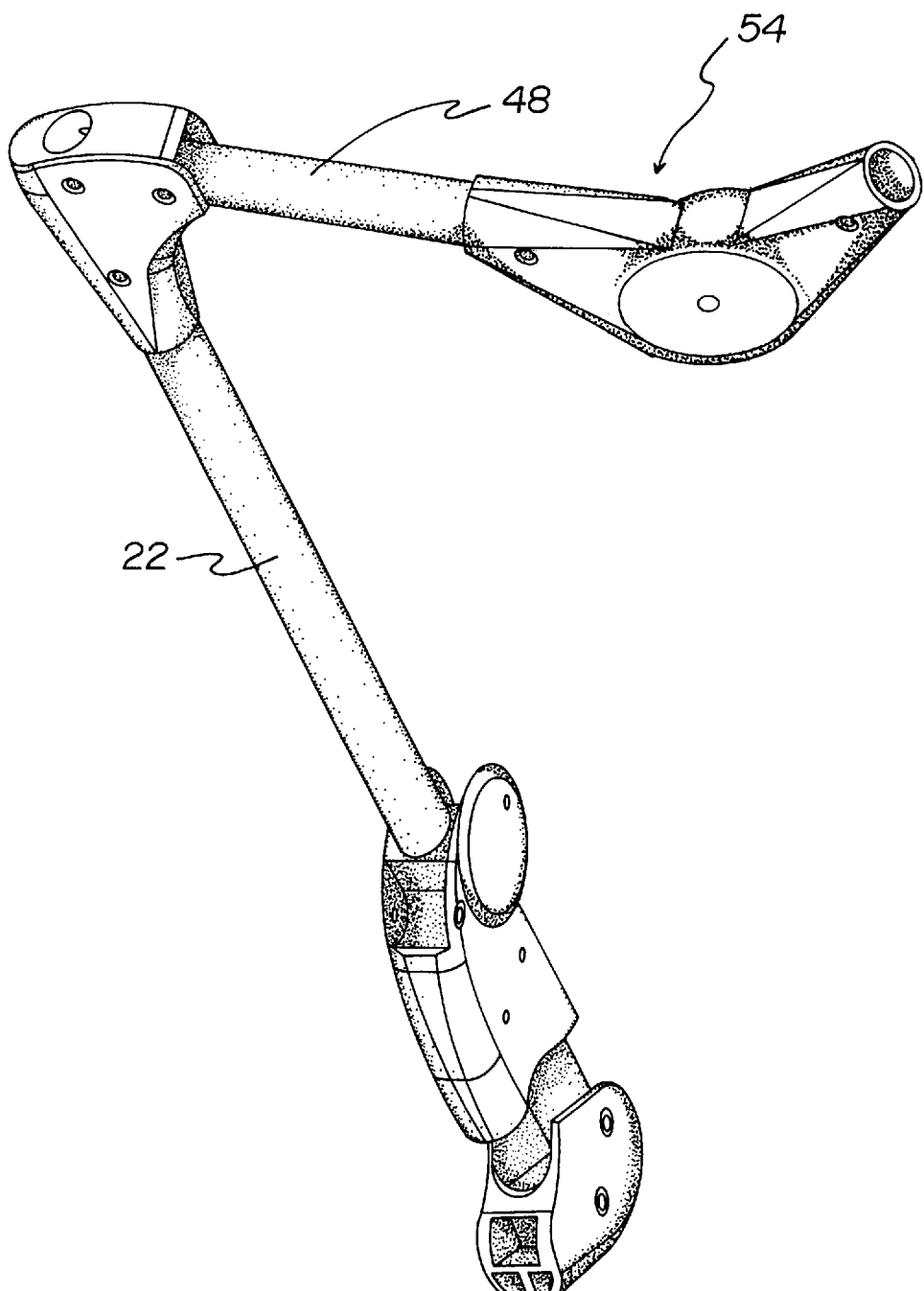
FIG. 13 is a perspective view of the upper lateral lock assembly and side pivot assembly as coupled to the first side frame.

With reference to FIGS. 10–12, the first and second pivot assemblies 34 and 36 will next be described. The two pivot assemblies are identical in construction, consequently, only one such assembly will be described in detail. With continuing reference to FIGS. 10–12, the side frame intermediate pivot assembly includes a housing component 92 and a receptacle component 94. Additionally, a plunger 96 is slidably positioned within the housing component 92. This plunger 96 is spring biased such as to normally extend into the receptacle component 94 and thereby prevent the pivotal movement between the upper and lower extents of the side frame. Thus, the pivot assemblies have a first, engaged, orientation wherein the plunger 96 is positioned within the receptacle component 94; and a second, disengaged, orientation wherein the plunger 96 is removed from the housing component 92.

Figures 8, 9:
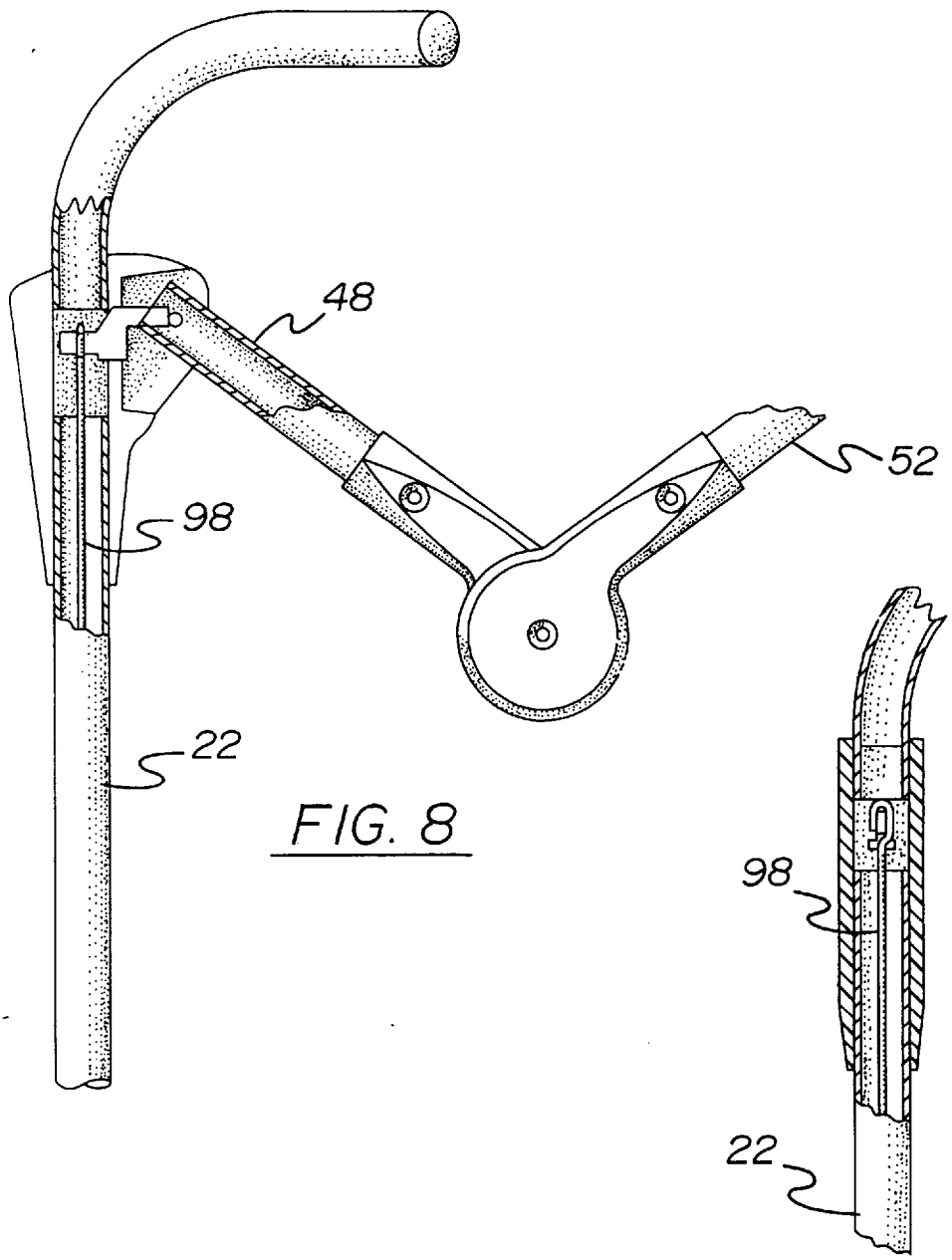
FIG. 8 is a cross section of FIG. 6.
FIG. 9 is a cross section of FIG. 7.

The pivot assemblies are only in their disengaged orientations after the upper pair of lateral braces have pivoted relative to one another. Thus, the pivoting of the upper and lower extents of the side frames occurs only after upper lateral lock assembly permits the pivoting of the upper pair of lateral braces. This arrangement is achieved via first and second plunger linkages 98 and 102. Although linkages are described in accordance with the present invention other structures would suffice such as a semi rigid cord or wire. More specifically, with reference to FIGS. 8–10, a first plunger linkage 98 serves to interconnect the first upper lateral brace 48 and the plunger 96 of the first side intermediate pivot assembly 34. This first plunger linkage 98 functions such that pivotal movement of the first upper lateral brace 48 brings the first pivot assembly 34 into its disengaged orientation. Thus, pivotal movement between the upper and lower extents of the first side frame 22 is permitted.

In a similar fashion, a second plunger linkage 102 interconnects the second upper lateral brace 52 and the plunger 96 of the second side intermediate pivot assembly 36. This second plunger linkage 102 functions such that pivotal movement of the second upper lateral brace 52 brings the second pivot assembly 36 into its disengaged orientation. Thus, pivotal movement between the upper and lower extents of the second side frame 24 is permitted.

Therefore, the operating orientation of the frame is achieved when the upper lateral, lower lateral, and two side pivot assemblies are in their engaged orientations. The operating orientation of the frame structure is most clearly seen in reference to FIGS. 1–4. When a user wishes to collapse the stroller the following steps must be taken: First, bring the upper lateral lock assembly into its disengaged orientation. Next, the upper lateral lock assembly is pushed inwardly to effect the pivoting of the two upper lateral braces with respect to the first and second side frames. The collar of the lower lateral lock assembly must also be disengaged to bring the lower lateral lock into its disengaged orientation. As the upper lateral braces are pivoted the upper lateral lock moves downwardly. Also, as the lower lateral braces are pivoted the lower lateral lock moves upwardly. The pivotal motion of the upper lateral braces provides tension within the length of the two plunger linkages. This tension within the plunger linkages brings the two pivot assemblies into their disengaged states. Next, the upper extents of the side frames are pivoted toward the lower extents of the side frames. The stroller is now in its collapsed configuration.

The collapsible and foldable frame does not in anyway interfere with the seating material that is adapted to be positioned upon the frame. The seating material 104 has its two sides removably secured to the two side frames of the frame structure. Furthermore, the lower extent of the seating material is removably secured over each curved seating frame element. The seating portion of the stroller is created by positioning of the seating material over these curved seating frame elements.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A collapsible three wheeled stroller for use in transporting an infant comprising in combination:

a first side frame having an upper extent and a lower extent and a pivot assembly therebetween, a second side frame having an upper extent and a lower extent and a pivot assembly therebetween, the lower extents of the first and second side frames being pivotally connected;

a first side rearward frame having an end secured to the pivot assembly of the first side and a distal end, a second side rearward frame having an end secured to the pivot assembly of the second side and a distal end;

a first upper lateral brace secured to the upper extent of the first side frame, a second upper lateral brace secured to the upper extent of the second side frame, an upper lateral lock assembly pivotally interconnecting the first and second upper lateral braces;

a front wheel assembly interconnected to the lower extents of the first and second side frames;

a first side rear wheel assembly secured to the distal end of the first rearward frame, a second side rear wheel assembly secured to the distal end of the second rearward frame;

a first lower lateral brace secured to the first side rear wheel assembly, a second lower lateral brace secured to the second side rear wheel assembly, a lower lateral lock assembly pivotally interconnecting the first and second lower lateral braces;

a first cross brace interconnecting the lower extent of the second side frame and the first rear wheel assembly, a second cross brace interconnecting the lower extent of the first side frame and the second rear wheel assembly;

the first side intermediate pivot assembly including a housing component and a receptacle component, a plunger slidably positioned within the housing component, the plunger being spring biased such as to normally extent into the receptacle component and thereby prevent pivotal movement between the upper and lower extent of the first side frame;

the second side intermediate pivot assembly including a housing component and a receptacle component, a plunger slidable positioned within the housing component, the plunger being spring biased such as to normally extend into the receptacle component and thereby prevent pivotal movement between the upper and lower extent of the second side frame;

a first plunger linkage interconnecting the first upper lateral brace and the plunger of the first side intermediate pivot assembly, the first plunger linkage functioning such that pivotal movement of the first upper lateral brace disengages the plunger of the first intermediate pivot assembly from the receptacle component to thereby permit pivotal movement between the upper and lower extents of the first side frame;

a second plunger linkage interconnecting the second upper lateral brace and the plunger of the second side intermediate pivot assembly, the second plunger linkage functioning such that pivotal movement of the second upper lateral brace disengages the plunger of the second intermediate pivot assembly from the receptacle component to thereby permit pivotal movement between the upper and lower extends of the second side frame.

2. A collapsible stroller for use in transporting an infant comprising in combination:

a first side frame having an upper extent and a lower extent, and a pivot assembly therebetween, a second side frame having an upper extent and a lower extent and a pivot assembly therebetween, the lower extents of the first and second side frames being pivotally connected;

a first side rearward frame having an end interconnected with the pivot assembly of the first side frame and a distal end, a second side rearward frame having an end interconnected with the pivot assembly of the second side frame and a distal end;

a first upper lateral brace secured to the upper extent of the first side frame, a second upper lateral brace secured to the upper extent of the second side frame, an upper lateral lock assembly pivotally interconnecting the first and second upper lateral braces;

a front wheel assembly interconnected to the lower extents of the first and second side frames;

a first side rear wheel assembly secured to the distal end of the first rearward frame, a second side rear wheel assembly secured to the distal end of the second rearward frame a first lower lateral brace secured to the first side rear wheel assembly, a second lower lateral brace secured to the second side rear wheel assembly, a lower lateral lock assembly pivotally interconnecting the first and second lower lateral braces;

the first side intermediate pivot assembly includes a housing component and a receptacle component, a plunger slidably positioned within the housing component, the plunger being spring biased such as to normally extent into the receptacle component and thereby prevent pivotal movement between the upper and lower extent of the first side frame; and the second side intermediate pivot assembly includes a housing component and a receptacle component, a plunger slidable positioned within the housing component, the plunger being spring biased such as to normally extend into the receptacle component and thereby prevent pivotal movement between the upper and lower extent of the second side frame;

a first plunger linkage interconnecting the first upper lateral brace and the plunger of the first side intermediate pivot assembly, the first plunger linkage functioning such that pivotal movement of the first upper lateral brace disengages the plunger of the first intermediate pivot assembly from the receptacle component to thereby permit pivotal movement between the upper and lower extents of the first side frame; and a second plunger linkage interconnecting the second upper lateral brace and the plunger of the second side intermediate pivot assembly, the second plunger linkage functioning such that pivotal movement of the second upper lateral brace disengages the plunger of the second intermediate pivot assembly from the receptacle component to thereby permit pivotal movement between the upper and lower extends of the second side frame.

3. A collapsible stroller for use in transporting an infant comprising in combination:

a first side frame having an upper extent and a lower extent, and a pivot assembly therebetween, a second side frame having an upper extent and a lower extent and a pivot assembly therebetween, the lower extents of the first and second side frames being pivotally connected;

a first side rearward frame having an end interconnected with the pivot assembly of the first side frame and a distal end, a second side rearward frame having an end interconnected with the pivot assembly of the second side frame and a distal end;

a first upper lateral brace secured to the upper extent of the first side frame, a second upper lateral brace secured to the upper extent of the second side frame, an upper lateral lock assembly pivotally interconnecting the first and second upper lateral braces;

a front wheel assembly interconnected to the lower extents of the first and second side frames;

a first side rear wheel assembly secured to the distal end of the first rearward frame, a second side rear wheel assembly secured to the distal end of the second rearward frame;

the first side intermediate pivot assembly includes a housing component and a receptacle component, a plunger slidably positioned within the housing component, the plunger being spring biased such as to normally extend into the receptacle component and thereby prevent pivotal movement between the upper and lower extent of the first side frame; and the second side intermediate pivot assembly includes a housing component and a receptacle component, a plunger slidable positioned within the housing component, the plunger being spring biased such as to normally extend into the receptacle component and thereby prevent pivotal movement between the upper and lower extent of the second side frame;

a first plunger linkage interconnecting the first upper later brace and the plunger of the first side intermediate pivot assembly, the first plunger linkage functioning such that pivotal movement of the first upper lateral brace disengages the plunger of the first intermediate pivot assembly from the receptacle component to thereby permit pivotal movement between the upper and lower extents of the first side frame; and a second plunger linkage interconnecting the second upper lateral brace and the plunger of the second side intermediate pivot assembly, the second plunger linkage functioning such that pivotal movement of the second upper lateral brace disengages the plunger of the second intermediate pivot assembly from the receptacle component to thereby permit pivotal movement between the upper and lower extends of the second side frame.

4. The collapsible stroller as described in claim 3 further comprising:

a first cross brace interconnecting the lower extent of the second side frame and the first rear wheel assembly, a second cross brace interconnecting the lower extent of the first side frame and the second rear wheel assembly;

a first clevis interconnecting the first cross brace to the lower extent of the second side frame; and a second clevis interconnecting the second cross brace to the lower extent of the first side frame, each clevis permitting the cross brace to both pivot and rotate relative to the lower extent of the side frame.

* * * * *